US012614941B2

(12) United States Patent
Keum et al.

(10) Patent No.: US 12,614,941 B2
(45) Date of Patent: Apr. 28, 2026

(54) ELECTRIC MACHINE WITH COOLING CHANNEL LOOPS FOR STATOR MAGNETIC POLES

(71) Applicant: GM GLOBAL TECHNOLOGY OPERATIONS LLC, Detroit, MI (US)

(72) Inventors: SeungHwan Keum, Northville, MI (US); Jian Yao, Shanghai (CN); Chengwu Duan, Shanghai (CN); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 18/739,774

(22) Filed: Jun. 11, 2024

(65) Prior Publication Data

US 2025/0253730 A1 Aug. 7, 2025

(30) Foreign Application Priority Data

Feb. 2, 2024 (CN) .......................... 202410153054.5

(51) Int. Cl.
*H02K 3/24* (2006.01)
*H02K 1/14* (2006.01)
*H02K 1/2793* (2022.01)
(52) U.S. Cl.
CPC ................. *H02K 3/24* (2013.01); *H02K 1/14* (2013.01); *H02K 1/2793* (2013.01)
(58) Field of Classification Search
CPC .......... H02K 3/24; H02K 1/14; H02K 1/2793; H02K 1/20; H02K 5/203; H02K 9/197; H02K 21/24
See application file for complete search history.

(56) References Cited

U.S. PATENT DOCUMENTS

2010/0072834 A1 3/2010 Crane
2011/0221287 A1 9/2011 Lucchi
(Continued)

FOREIGN PATENT DOCUMENTS

CN 111030401 A 4/2020
WO 2021074776 A1 4/2021
(Continued)

*Primary Examiner* — Tulsidas C Patel
*Assistant Examiner* — Mohammed Ahmed Qureshi
(74) *Attorney, Agent, or Firm* — Quinn IP Law

(57) ABSTRACT

An axial flux electric motor includes a rotationally fixed stator defining a rotational axis and having a plurality of conductive stator magnetic poles arranged radially about the rotational axis. The electric motor also includes a rotor spaced axially from one side of the stator, rotatably mounted coaxially with the rotational axis, and having a plurality of permanent magnets (PMs) arranged symmetrically around the rotational axis and facing the stator. A torque is generated on the at least one rotor by a rotating magnetic field established via interaction between the corresponding PMs and the magnetic poles when an electrical current is passed through the magnetic poles. The stator additionally includes a plurality of cooling channel loops, together surrounding each of the stator magnetic poles, and configured to receive and pass therethrough a fluid to remove thermal energy from the stator magnetic poles resulting from an electrical current passed therethrough.

20 Claims, 7 Drawing Sheets

(56)                    References Cited

U.S. PATENT DOCUMENTS

| | | | |
|---|---|---|---|
| 2011/0241460 A1 * | 10/2011 | Mebarki | H02K 1/20 29/598 |
| 2018/0054097 A1 * | 2/2018 | Dlala | H02K 1/16 |
| 2018/0076694 A1 * | 3/2018 | Aronovich | H02K 15/12 |
| 2021/0075282 A1 | 3/2021 | Girotto et al. | |
| 2022/0416613 A1 | 12/2022 | Goykhman et al. | |
| 2023/0387735 A1 * | 11/2023 | Keum | H02K 15/12 |

FOREIGN PATENT DOCUMENTS

| | | | |
|---|---|---|---|
| WO | 2022168009 A1 | 8/2022 | |
| WO | 2023113702 A1 | 6/2023 | |

* cited by examiner

ELECTRIC MACHINE WITH COOLING CHANNEL LOOPS FOR STATOR MAGNETIC POLES

CLAIM OF PRIORITY AND CROSS-REFERENCE TO RELATED APPLICATION

This application claims the benefit of Chinese Application Serial No. CN202410153054.5 filed Feb. 2, 2024, the entire content of which is incorporated by reference in its entirety.

INTRODUCTION

The disclosure relates to an electric machine with cooling channel loops for the machine's stator magnetic poles.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are classified into two categories based on the direction of the magnetic field— axial flux motors and radial flux motors.

As a byproduct of generated torque, electric motors produce thermal energy which may adversely affect motor performance and reliability. Cooling of an electric motor may therefore remove thermal stress seen by motor poles or windings and provide longer motor life under or close to peak load. Additionally, electric motor cooling may generally quiet motor operation and enhance motor operation at higher speeds, as well as facilitate reduced motor inertia and packaging.

SUMMARY

An axial flux electric motor includes a rotationally fixed stator defining a rotational axis and having a plurality of conductive stator magnetic poles arranged radially about the rotational axis. The electric motor also includes at least one rotor spaced axially from one side of the stator, rotatably mounted coaxially with the rotational axis, each having a plurality of permanent magnets (PMs) arranged symmetrically around the rotational axis and facing the stator. A torque is generated on the at least one rotor by a rotating magnetic field established via interaction between the corresponding PMs and the magnetic poles when an electrical current is passed through the magnetic poles. The stator additionally includes a plurality of cooling channel loops, together surrounding each of the stator magnetic poles, and configured to receive and pass therethrough a fluid to remove thermal energy from the stator magnetic poles resulting from an electrical current passed therethrough.

Each cooling channel loop may have a corresponding individual fluid inlet and fluid outlet.

The plurality of cooling channel loops may have a single fluid inlet and a single fluid outlet.

The cooling channel loops may be arranged in a pattern of nested fluid conduits.

The cooling channel loops may overlap in a plan view and each cooling channel loop may have a variable cross-sectional area to optimize fluid flow distribution proximate a respective stator magnetic pole.

The cross-sectional area of each cooling channel loop may be relatively smaller in a region of overlap with another cooling channel loop and relatively greater in a region without overlap with another cooling channel loop.

Each cooling channel loop may extend partially around each stator magnetic pole, alternating between extending proximate a radially outer portion of one stator magnetic pole and a radially inner portion of a neighboring stator magnetic pole.

Adjacent cooling channel loops may overlap and nest proximate the radially inner portions of the stator magnetic poles.

The stator may include an epoxy surrounding the stator magnetic poles. In such an embodiment, the cooling channel loops may be defined by the epoxy.

The plurality of cooling channel loops may be generated via a sacrificial material using additive manufacturing.

The fluid may be a dielectric coolant.

Specifically, the dielectric coolant may be either an automatic transmission fluid (ATF), a hydrofluoroether (HFE), or a perfluoropolyether (PFPE).

A motor vehicle employing such an axial flux electric motor is also contemplated.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
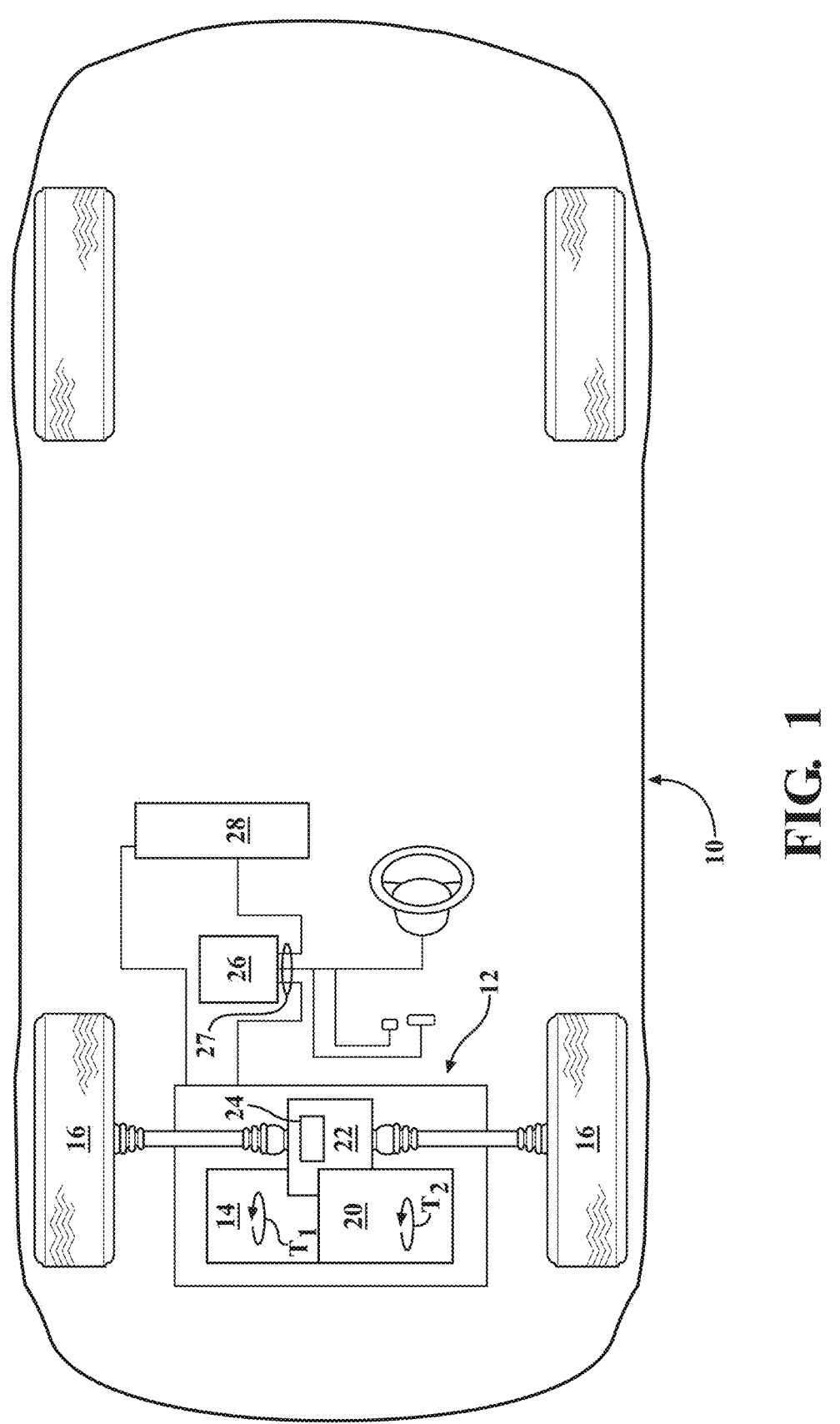
FIG. 1 is a schematic illustration of a motor vehicle having a powertrain employing an axial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference, and thus are not intended to be limiting. For example, terms such as "above" and "below" refer to directions in the drawings to which reference is made. Terms such as "front", "back", "fore", "aft", "left", "right", "rear", and "side" describe the orientation and/or location of portions of the components or elements within a consistent but arbitrary frame of reference, which is made clear by reference to the text and the associated drawings describing the components or elements under discussion. Moreover, terms such as "first", "second", "third", and so on may be used to describe separate components. Such terminology may include the words specifically mentioned above, derivatives thereof, and words of similar import.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque T1 (shown in FIG. 1) for propulsion of the vehicle 10 via driven wheels 16, such as relative to a road surface. The motor-generator 14 is configured as an axial flux machine in which non-permanent magnetic poles are induced on the motor's ferromagnetic rotor(s) to be described in detail below.

As shown in FIG. 1, the powertrain 12 may also include a second power-source 20, such as an internal combustion engine configured to generate a second power-source torque T2. The power-sources 14 and 20 may act in concert to power the vehicle 10 and be operatively connected to a transmission assembly 22. The transmission assembly 22 may be configured to transmit first and/or second power-source torques T1, T2 to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10.

Alternatively, a respective first power-source 14 may be incorporated into each driven wheel 16, for example as an in-wheel/hub motor. As shown, the motor vehicle 10 additionally includes a programmable electronic controller 26 configured to communicate via a high-voltage BUS 27 and control the powertrain 12 to generate a predetermined amount of power-source torque (such as the sum of T1 and $T_2$) and regulate various other vehicle systems. The vehicle 10 additionally includes an energy storage system 28, such as one or more batteries, configured to generate and store electrical energy for powering the power-sources 14 and 20.

Figure 2:
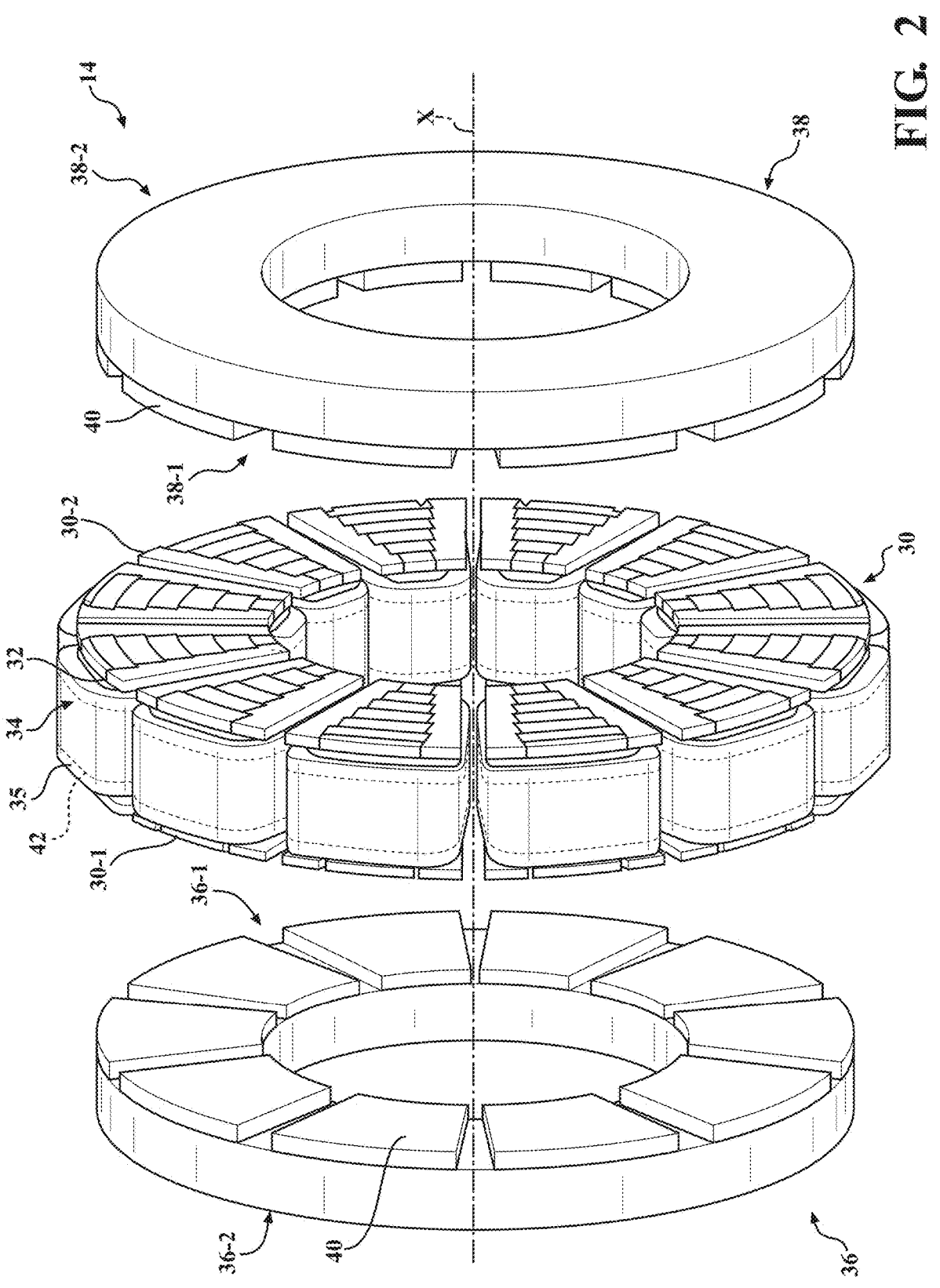
FIG. 2 is a schematic, close-up, exploded partial perspective view of the axial flux motor-generator shown in FIG. 1, depicting a stator assembly with first and second rotors, with the stator having a plurality of cooling channel loops surrounding stator magnetic poles, according to an embodiment of the disclosure.

As shown in FIG. 2, the motor-generator 14 includes a rotationally fixed stator 30. The stator 30 defines a rotational axis X and includes a stator core 32 and a plurality of magnetic poles (e.g., coils) 34 arranged radially about the rotational axis X. The stator core 32 may be constructed from a ferromagnetic material. A dielectric epoxy 35 may be arranged on the stator 30, surrounding the stator magnetic poles 34 and between the stator core 32 and the stator magnetic poles 34. The stator 30 has two opposing sides—a first side 30-1 and a second side 30-2. The motor-generator 14 also includes a first rotor 36 spaced axially from the first side 30-1 of the stator 30 creating an operative airgap therebetween. The first rotor 36 is rotatably mounted coaxially with the rotational axis X and has a first rotor exterior side or surface 36-1 facing the stator 30 and an opposite rotor exterior side or surface 36-2.

The motor-generator 14 may additionally include a second rotor 38 rotatably mounted coaxially with the rotational axis X and spaced axially from the second side 30-2 of the stator 30. The second rotor 38 may be characterized by a second rotor exterior surface 38-1 facing the stator 30 and an opposite rotor exterior side or surface 38-2. Each of the first and second rotors 36, 38 includes a plurality of permanent magnets (PMs) 40 arranged symmetrically around the rotational axis X and facing the stator 30. A torque is generated on the first and/or second rotors 36, 38 by a rotating magnetic field established as a result of interaction between the corresponding PMs 40 and the stator's magnetic poles 34 when an electrical current is passed through the magnetic poles.

Figure 3:
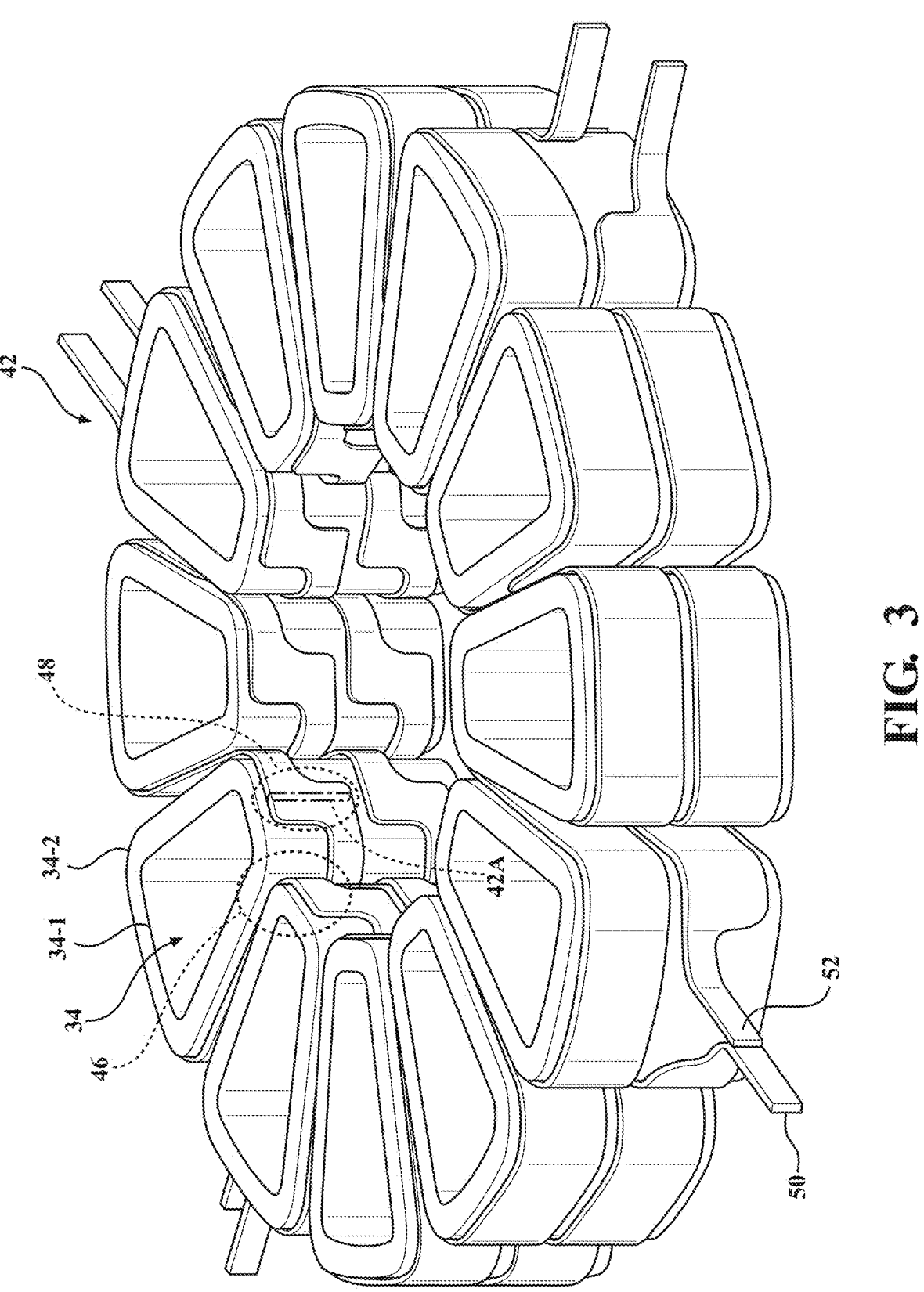
FIG. 3 is a schematic, close-up, partial perspective view of the stator shown in FIG. 2, depicting multiple nested cooling channel loops with individual fluid inlets and outlets, according to the disclosure.

With continued reference to FIG. 2, the stator 30 additionally includes multiple cooling channel loops 42. Each cooling channel loop 42 may be defined by the epoxy 35 arranged between an individual magnetic pole 34 and the stator core 32. As shown in FIG. 3, the cooling channel loops 42 may be arranged in a pattern 43 of nested, i.e., overlapping and substantially intertwined, fluid conduits. Each cooling channel loop 42 may extend proximate to and wind around at least one of the stator's magnetic poles 34, such that the multiple loops together surround each stator magnetic pole via their respective channels. The cooling channel loops 42 may be generated via additive manufacturing using a sacrificial material, such as a polyvinylalcohol (PV). Each of the cooling channel loops 42 is configured to receive and pass therethrough a fluid 44 to remove thermal energy from the stator magnetic poles 34 resulting from the electrical current. The fluid 44 may be a dielectric coolant to preclude conduction of electrical current therethrough. Such a dielectric coolant may for example, be an automatic transmission fluid (ATF), a hydrofluoroether (HFE), or a perfluoropolyether (PFPE).

Figure 4:
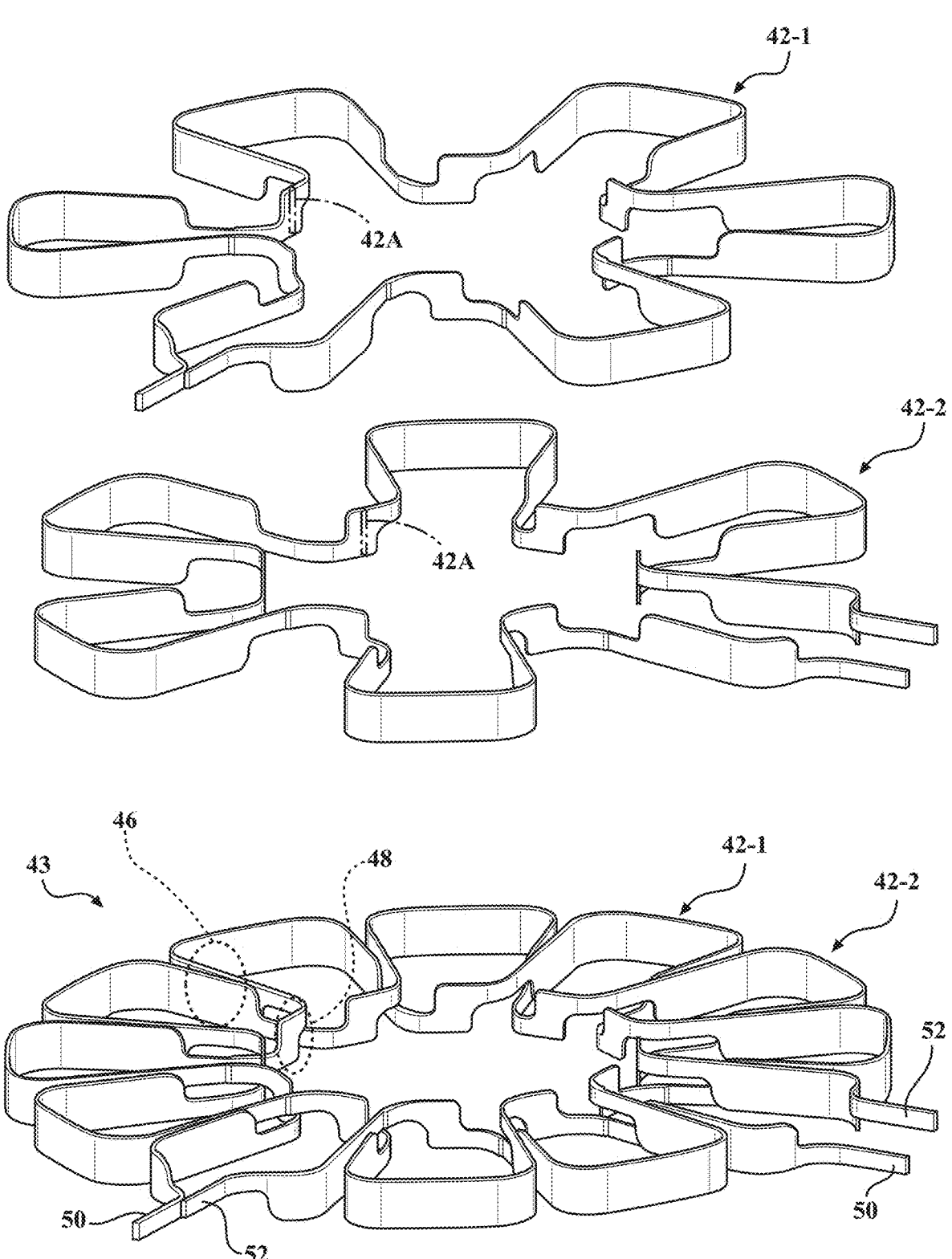
FIG. 4 is a schematic, close-up, partial perspective view of the stator cooling channel loops shown in FIG. 2, depicting the individual cooling channel loops before and after nesting, according to the disclosure.

As shown in FIG. 4, each cooling channel loop 42, such as a first loop 42-1 and a second loop 42-2, may extend partially around each stator magnetic pole 34. Individual cooling channel loops 42 may overlap in a plan view (shown in FIGS. 3 and 4) and each cooling channel loop may have a variable cross-sectional area 42A to optimize fluid flow distribution proximate a respective stator magnetic pole 34. Such optimized fluid flow distribution may be employed to target hotspots on the corresponding stator magnetic poles 34. Each cooling channel loop 42 may wind around the stator's magnetic poles 34 alternating between extending proximate a radially outer portion 34-1 of one magnetic pole and a radially inner portion 34-2 of a neighboring magnetic pole (shown in FIG. 3).

Figure 6:
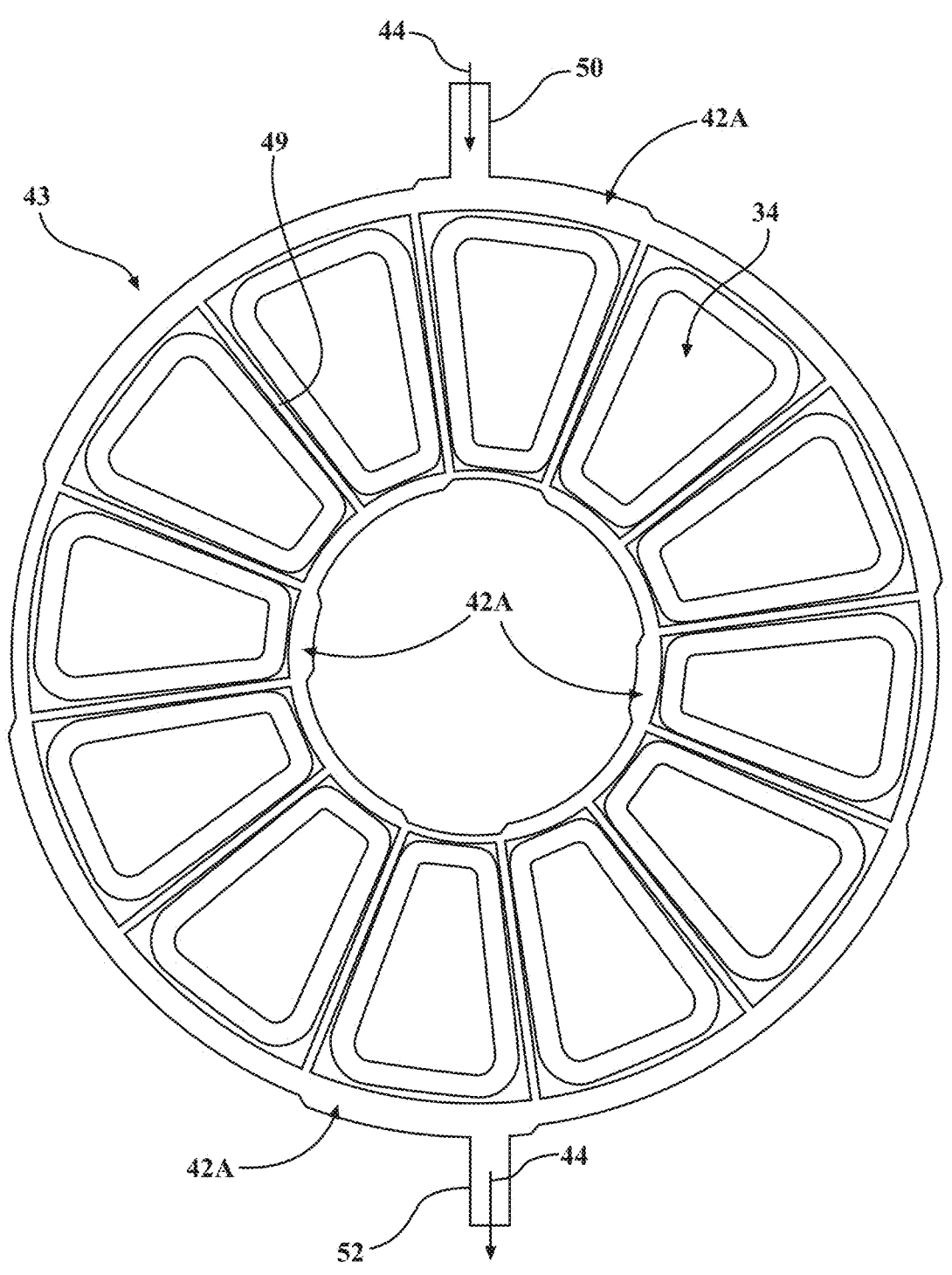
FIG. 6 is a schematic, close-up, plan view of the stator cooling channel loops shown in FIG. 2, depicting the individual cooling channel loops fluidly connected in parallel and portions of the channel loops having enlarged cross-sectional area, according to the disclosure.

For example, as shown in FIGS. 3 and 4, adjacent cooling channel loops 42 may overlap and nest proximate the radially inner portions 34-2 of the stator magnetic poles 34. As may be seen in FIG. 3, a cross-sectional area 42A of each cooling channel loop 42 may be relatively smaller in a region of overlap 46 with another cooling channel loop and be relatively greater in a region without overlap 48 with another cooling channel loop. Alternatively, as shown in FIG. 6, the cooling channel loops 42 may be connected fluidly in parallel with at least a portion of the channel loops having the variable cross-sectional area 42A or the entire individual channel loop may have an enlarged cross-sectional area relative to a neighboring loop. In such an embodiment, the comparatively larger cross-sectional area 42A of a particular cooling channel loop 42 may be arranged proximate to or substantially surrounding a corresponding magnetic pole 34 or portions thereof to target a specific stator hotspot and/or magnetic pole.

Figure 5:
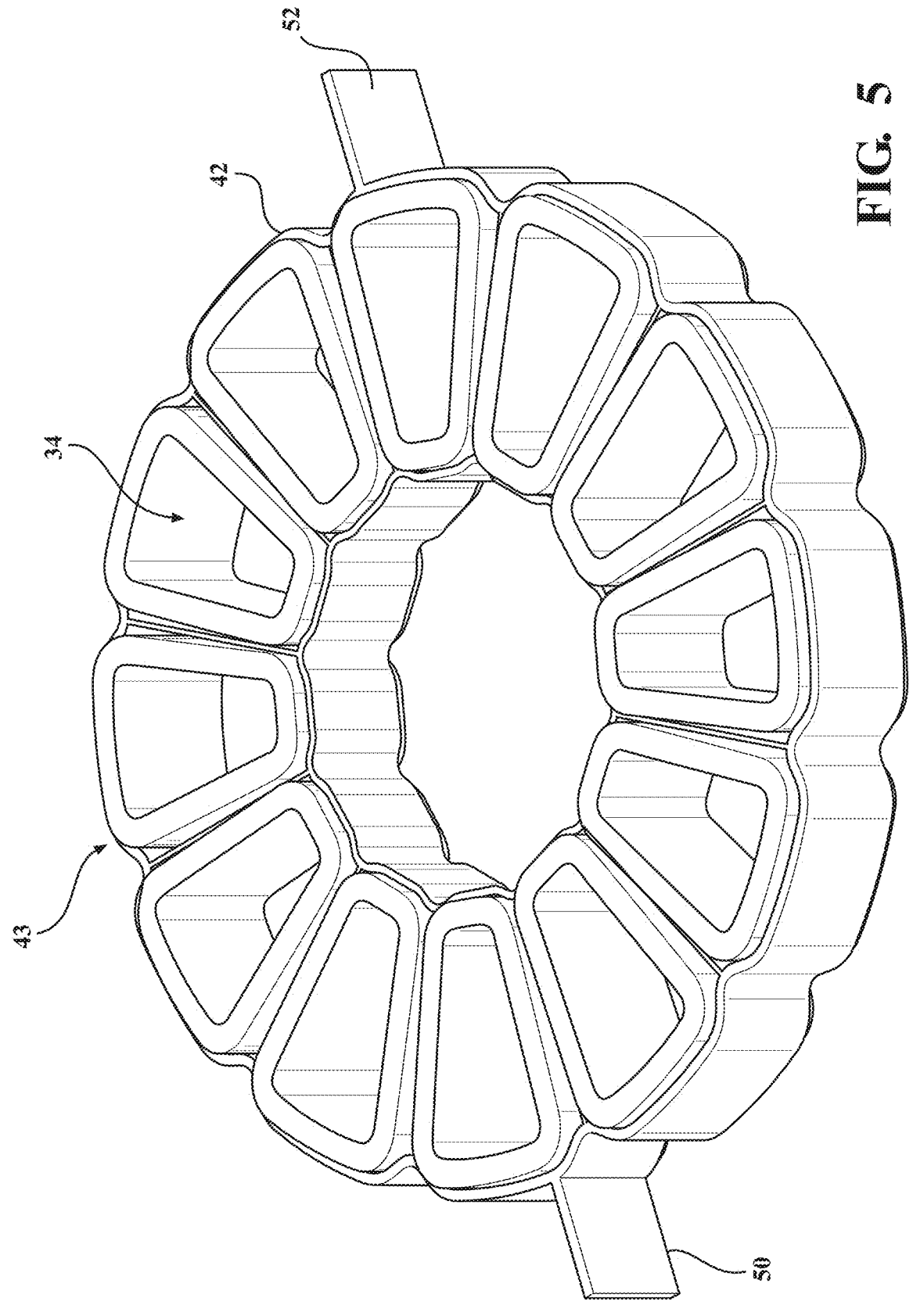
FIG. 5 is a schematic, close-up, partial perspective view of the stator shown in FIG. 2, depicting multiple nested cooling channel loops with one fluid inlet and one fluid outlet, according to the disclosure.

With resumed reference to FIGS. 3 and 4, each cooling channel loop 42 may have a corresponding individual fluid inlet 50 and fluid outlet 52. Alternatively, as shown in FIG. 5, the plurality of cooling channel loops 42, i.e., the pattern 43 of nested loops, may have a single fluid inlet 50 and a single fluid outlet 52. The cooling channel loop inlet(s) 50 and outlet(s) 52 may be embedded in and/or mounted to the epoxy 35. Although not specifically shown, in another embodiment, each magnetic pole 34 may have one associated independent coolant channel loop 42 with an attendant individual fluid inlet 50 and individual fluid outlet 52 or such separate channel loops may be together connected to a common inlet and outlet. The cross-sectional area 42A may vary around the circumference of the stator 30 and be enlarged proximate the fluid inlet(s) 50 and outlet(s) 52 relative to the cross-sectional area elsewhere along the cooling channel loop(s) 42 (shown in FIG. 6).

Stator hot spots typically occur approximately midway between the inside diameter (ID) and outside diameter (OD) of the stator magnetic poles 34. Cooling channel loops 42 include bridge channels 49 arranged between the stator poles 34, although the flow distribution among the individual bridges may not be even. For example, as shown in FIG. 6, in locations arranged 180 degrees apart, such as at the 90 and 270 degrees relative to the fluid inlet and outlet 50, 52, there may be minimal fluid flow through the corresponding bridge 49, which causes the above-noted stator hot spots. The pattern 43 cooling channels at both ID and OD may be configured to generate a more uniform coolant 44 flow distribution among the individual bridges 49, specifically targeting the hotspots midway between the fluid inlet 50 and fluid outlet 52.

With reference to the embodiment shown in FIG. 6, from the fluid inlet 50 to the bridges 49 arranged near 90 and 270 degrees, the cross-sectional area 42A of the cooling channel at the OD may be varied from relatively large to small, while the cross-sectional area of the cooling channel at the ID side is varied inversely from small to large. The cross-sectional area 42A may be varied continuously or in steps to urge the coolant 44 from OD to ID through the bridges 49. From bridges 49 arranged near 90 and 270 degrees to the fluid outlet 52, the cross-sectional area 42A of the cooling channel at the OD may be varied from relatively small to large, while the cross-sectional area of the cooling channel at the ID side is varied inversely from relatively large to small. The subject variations along the OD and ID may be used to cooperatively urge the coolant 44 from ID to OD through the bridges 49 from the fluid inlet 50 to the fluid outlet 52, and in the process cooling the above-noted hotspots.

Figure 7:
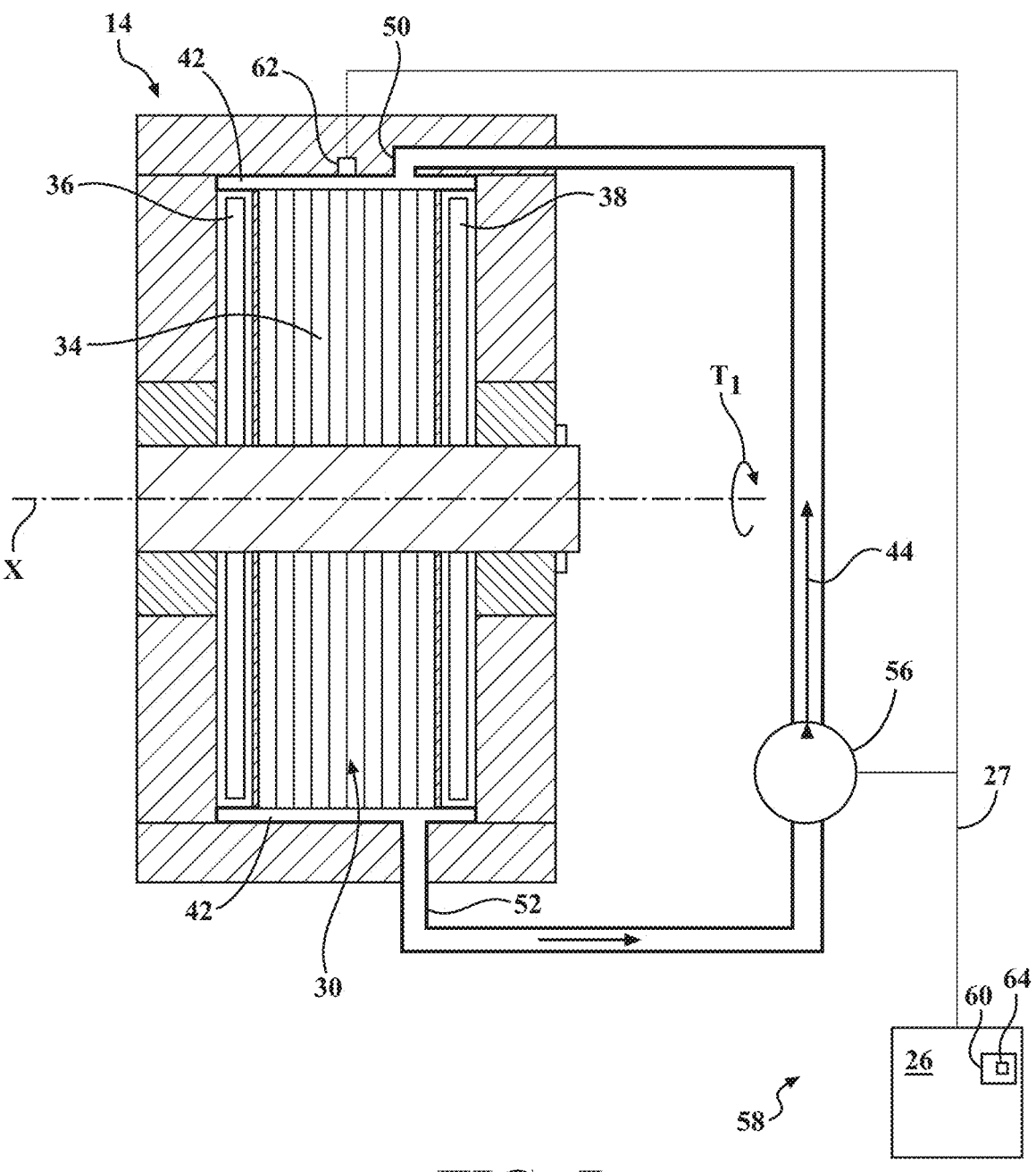
FIG. 7 is a schematic close-up cross-sectional side view of the axial flux motor-generator shown in FIG. 2, depicting a fluid circulation arrangement including fluid channels extending into the stator to feed the cooling channel loops, according to the disclosure.

As shown in FIG. 7, each of the cooling channel loop inlet(s) 50 and outlet(s) 52 may be connected to a fluid pump 56 configured to pressurize and circulate the coolant 44, i.e., supply the coolant from a fluid sump to the cooling channel loops 42. The fluid pump 56 may be part of an electric motor cooling system 58 operated via the electronic controller 26. The electronic controller 26 may be programmed with an algorithm 60 to regulate the fluid pump 56 using detected, such as via corresponding sensors (indicated generally via numeral 62) or calculated variables. Such variables may, for example, be motor phase current, motor rotational speed, temperature of the stator 30, and a flow rate of the coolant 44 in the axial flux electric motor 14. The temperature of the stator 30 may be either detected, otherwise determined, or estimated using recent history of other sensor readings, including that of the coolant temperature, and a motor operational map 64 programmed into the controller 26. The electric motor cooling system 58 may therefore be configured to remove thermal stress and, among multiple benefits, provide longer life under higher speeds or close to peak load for the electric motor 14, such as during propulsion of the motor vehicle 10.

In summary, a stator employing the pattern of nested cooling channel loops 42 using a circulating fluid provides an electric motor with dedicated cooling for the stator magnetic poles. Such nested cooling channel loops 34 permit each individual stator magnetic pole to be substantially surrounded by one or more cooling channels. Individual cooling channel loops may overlap and use variable cross-sections to optimize fluid flow distribution proximate hotspots on the stator magnetic poles. The cooling channel loops may extend through epoxy arranged between the stator core and the stator magnetic poles. The circulating fluid may be a dielectric coolant to coolant to prevent conduction of electrical current therethrough.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An axial flux electric motor comprising:

a rotationally fixed stator defining a rotational axis and having a plurality of conductive stator magnetic poles arranged radially about the rotational axis; and at least one rotor spaced axially from one side of the stator, rotatably mounted coaxially with the rotational axis, each having a plurality of permanent magnets (PMs) arranged symmetrically around the rotational axis and facing the stator;

wherein:

a torque is generated on the at least one rotor by a rotating magnetic field established via interaction between the corresponding PMs and the magnetic poles when an electrical current is passed through the magnetic poles; and the stator additionally includes a plurality of cooling channel loops, together surrounding each of the stator magnetic poles, and configured to receive and pass therethrough a fluid to remove thermal energy from the stator magnetic poles resulting from the electrical current.

2. The axial flux electric motor according to claim 1, wherein the plurality of cooling channel loops has a single fluid inlet and a single fluid outlet.

3. The axial flux electric motor according to claim 1, wherein the plurality of cooling channel loops is arranged in a pattern of nested fluid conduits.

4. The axial flux electric motor according to claim 3, wherein the cooling channel loops overlap in a plan view and each cooling channel loop has a variable cross-sectional area to optimize fluid flow distribution proximate a respective stator magnetic pole.

5. The axial flux electric motor according to claim 4, wherein the cross-sectional area of each cooling channel loop is relatively smaller in a region of overlap with another cooling channel loop and is relatively greater in a region without overlap with another cooling channel loop.

6. The axial flux electric motor according to claim 5, wherein each cooling channel loop extends partially around each stator magnetic pole, alternating between extending proximate a radially outer portion of one stator magnetic pole and a radially inner portion of a neighboring stator magnetic pole.

7. The axial flux electric motor according to claim 6, wherein adjacent cooling channel loops overlap and nest proximate the radially inner portions of the stator magnetic poles.

8. The axial flux electric motor according to claim 1, further comprising an epoxy surrounding the stator magnetic poles, and wherein the cooling channel loops are defined by the epoxy.

9. The axial flux electric motor according to claim 1, wherein the fluid is a dielectric coolant.

10. The axial flux electric motor according to claim 9, wherein the dielectric coolant is one of an automatic transmission fluid (ATF), a hydrofluoroether (HFE), and a perfluoropolyether (PFPE).

11. A motor vehicle comprising:

an axial flux electric motor configured to generate torque for propulsion of the motor vehicle, the axial flux electric motor including:

a rotationally fixed stator defining a rotational axis and having a plurality of conductive stator magnetic poles arranged radially about the rotational axis; and at least one rotor spaced axially from one side of the stator, rotatably mounted coaxially with the rotational axis, each having a plurality of permanent magnets (PMs) arranged symmetrically around the rotational axis and facing the stator;

wherein:

a torque is generated on the at least one rotor by a rotating magnetic field established via interaction between the corresponding PMs and the magnetic poles when an electrical current is passed through the magnetic poles; and the stator additionally includes a plurality of cooling channel loops, together surrounding each of the stator magnetic poles, and configured to receive and pass therethrough a fluid to remove thermal energy from the stator magnetic poles resulting from the electrical current.

12. The motor vehicle according to claim 11, wherein the plurality of cooling channel loops has a single fluid inlet and a single fluid outlet.

13. The motor vehicle according to claim 11, wherein the plurality of cooling channel loops is arranged in a pattern of nested fluid conduits.

14. The motor vehicle according to claim 13, wherein the cooling channel loops overlap in a plan view and each cooling channel loop has a variable cross-sectional area to optimize fluid flow distribution proximate a respective stator magnetic pole.

15. The motor vehicle according to claim 14, wherein the cross-sectional area of each cooling channel loop is relatively smaller in a region of overlap with another cooling channel loop and is relatively greater in a region without overlap with another cooling channel loop.

16. The motor vehicle according to claim 15, wherein each cooling channel loop extends partially around each stator magnetic pole, alternating between extending proximate a radially outer portion of one stator magnetic pole and a radially inner portion of a neighboring stator magnetic pole.

17. The motor vehicle according to claim 16, wherein adjacent cooling channel loops overlap and nest proximate the radially inner portions of the stator magnetic poles.

18. The motor vehicle according to claim 11, wherein the stator includes an epoxy surrounding the stator magnetic poles, and wherein the cooling channel loops are defined by the epoxy.

19. The motor vehicle according to claim 11, wherein the fluid is a dielectric coolant, and wherein the dielectric coolant is one of an automatic transmission fluid (ATF), a hydrofluoroether (HFE), and a perfluoropolyether (PFPE).

20. An axial flux electric motor comprising:

a rotationally fixed stator defining a rotational axis and having a plurality of conductive stator magnetic poles arranged radially about the rotational axis; and at least one rotor spaced axially from one side of the stator, rotatably mounted coaxially with the rotational axis, each having a plurality of permanent magnets (PMs) arranged symmetrically around the rotational axis and facing the stator;

wherein:

a torque is generated on the at least one rotor by a rotating magnetic field established via interaction between the corresponding PMs and the magnetic poles when an electrical current is passed through the magnetic poles; and the stator additionally includes a plurality of cooling channel loops, together surrounding each of the stator magnetic poles, and configured to receive and pass therethrough a fluid to remove thermal energy from the stator magnetic poles resulting from the electrical current;

the plurality of cooling channel loops is arranged in a pattern of nested fluid conduits;

the cooling channel loops overlap in a plan view and each cooling channel loop has a variable cross-sectional area to optimize fluid flow distribution proximate a respective stator magnetic pole;

the cross-sectional area of each cooling channel loop is relatively smaller in a region of overlap with another cooling channel loop and is relatively greater in a region without overlap with another cooling channel loop; and each cooling channel loop extends partially around each stator magnetic pole, alternating between extending proximate a radially outer portion of one stator magnetic pole and a radially inner portion of a neighboring stator magnetic pole.

* * * * *